United States Patent
Baker et al.

(10) Patent No.: US 9,471,329 B2
(45) Date of Patent: Oct. 18, 2016

(54) OPTIMIZING COMPUTER HARDWARE USAGE IN A COMPUTING SYSTEM THAT INCLUDES A PLURALITY OF POPULATED CENTRAL PROCESSING UNIT ('CPU') SOCKETS

(71) Applicant: LENOVO ENTERPRISE SOLUTIONS (SINGAPORE) PTE. LTD., Singapore (SG)

(72) Inventors: Brian A. Baker, Raleigh, NC (US); Michael Decesaris, Carrboro, NC (US); Jeffrey R. Hamilton, Pittsboro, NC (US); Douglas W. Oliver, Round Rock, TX (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 155 days.

(21) Appl. No.: 14/219,286

(22) Filed: Mar. 19, 2014

(65) Prior Publication Data

US 2015/0268967 A1 Sep. 24, 2015

(51) Int. Cl.
- G06F 15/177 (2006.01)
- G06F 9/44 (2006.01)
- G06F 11/34 (2006.01)

(52) U.S. Cl.
CPC ......... G06F 9/4405 (2013.01); G06F 11/3409 (2013.01)

(58) Field of Classification Search
CPC .................................................. G06F 1/34401
See application file for complete search history.

(56) References Cited

U.S. PATENT DOCUMENTS

| | | |
|---|---|---|
| 5,491,788 A | 2/1996 | Cepulis et al. |
| 6,442,685 B1 | 8/2002 | French et al. |
| 6,708,283 B1 | 3/2004 | Nelvin et al. |
| 7,231,464 B1 | 6/2007 | Caudrelier et al. |
| 7,954,114 B2 | 5/2011 | Chamberlain et al. |
| 7,971,094 B1 | 6/2011 | Benn et al. |
| 8,375,363 B2 | 2/2013 | Zhou et al. |
| 8,839,032 B2 | 9/2014 | Walton |
| 2003/0233492 A1* | 12/2003 | Schelling ............... G06F 9/4405 713/375 |
| 2010/0174868 A1 | 7/2010 | Vorbach |
| 2013/0091380 A1 | 4/2013 | Decesaris et al. |
| 2015/0269015 A1 | 9/2015 | Baker et al. |
| 2015/0269047 A1 | 9/2015 | Baker et al. |

FOREIGN PATENT DOCUMENTS

WO WO9408291 A1 4/1994

\* cited by examiner

*Primary Examiner* — Kim Huynh
*Assistant Examiner* — Eric Chang
(74) *Attorney, Agent, or Firm* — Brandon C. Kennedy; Katherine S. Brown; Kennedy Lenart Spraggins LLP

(57) ABSTRACT

Optimizing computer hardware usage in a computing system that includes a plurality of populated central processing unit ('CPU') sockets, including: determining, by a socket configuration module, a number of CPUs to be utilized during operation of the computing system; determining, by the socket configuration module, performance characteristics associated with each available CPU, the performance characteristics associated with each available CPU including information describing computing devices such as memory devices, input/output ('I/O') devices, and other downstream devices that are coupled to one or more of the available CPUs; and selecting, by the socket configuration module in dependence upon the performance characteristics associated with each available CPU and a predetermined performance policy, a target CPU to utilize as a boot CPU.

19 Claims, 4 Drawing Sheets

OPTIMIZING COMPUTER HARDWARE USAGE IN A COMPUTING SYSTEM THAT INCLUDES A PLURALITY OF POPULATED CENTRAL PROCESSING UNIT ('CPU') SOCKETS

BACKGROUND OF THE INVENTION

1. Field of the Invention

The field of the invention is data processing, or, more specifically, methods, apparatuses, and products for optimizing computer hardware usage in a computing system that includes a plurality of populated central processing unit ('CPU') sockets.

2. Description of Related Art

Modern computing systems may include a plurality of computer processors such as a plurality of CPUs. Each CPU can be included in a CPU socket. In some computing systems, one or more of the CPUs may not be active as the CPU, one or more CPUs may serve as a failover CPU rather than the primary boot CPU, or the computing system may be otherwise configured such that all of the CPUs are not utilized. The CPUs that are chosen to be active in a multi-socket system are frequently based on a sequential socket identifier assignment. For example, the CPUs in socket 0, socket 1, socket 2, and socket 3 may be active while CPUs in socket 4 and socket 5 may be inactive. Furthermore, the CPU that will be used to boot the computing system may also be designated based on the socket identifier, such that the CPU in socket 0 will be utilized to boot the computing system. In such a way, the designation of a socket identifier is used to identify active CPUs and a boot CPU, with no consideration given to the relative performance capabilities of an individual CPU or a particular combination of CPUs.

SUMMARY OF THE INVENTION

Optimizing computer hardware usage in a computing system that includes a plurality of populated CPU sockets, including: determining, by a socket configuration module, a number of CPUs to be utilized during operation of the computing system; determining, by the socket configuration module, performance characteristics associated with each available CPU; and selecting, by the socket configuration module in dependence upon the performance characteristics associated with each available CPU and a predetermined performance policy, a target CPU to utilize as a boot CPU.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
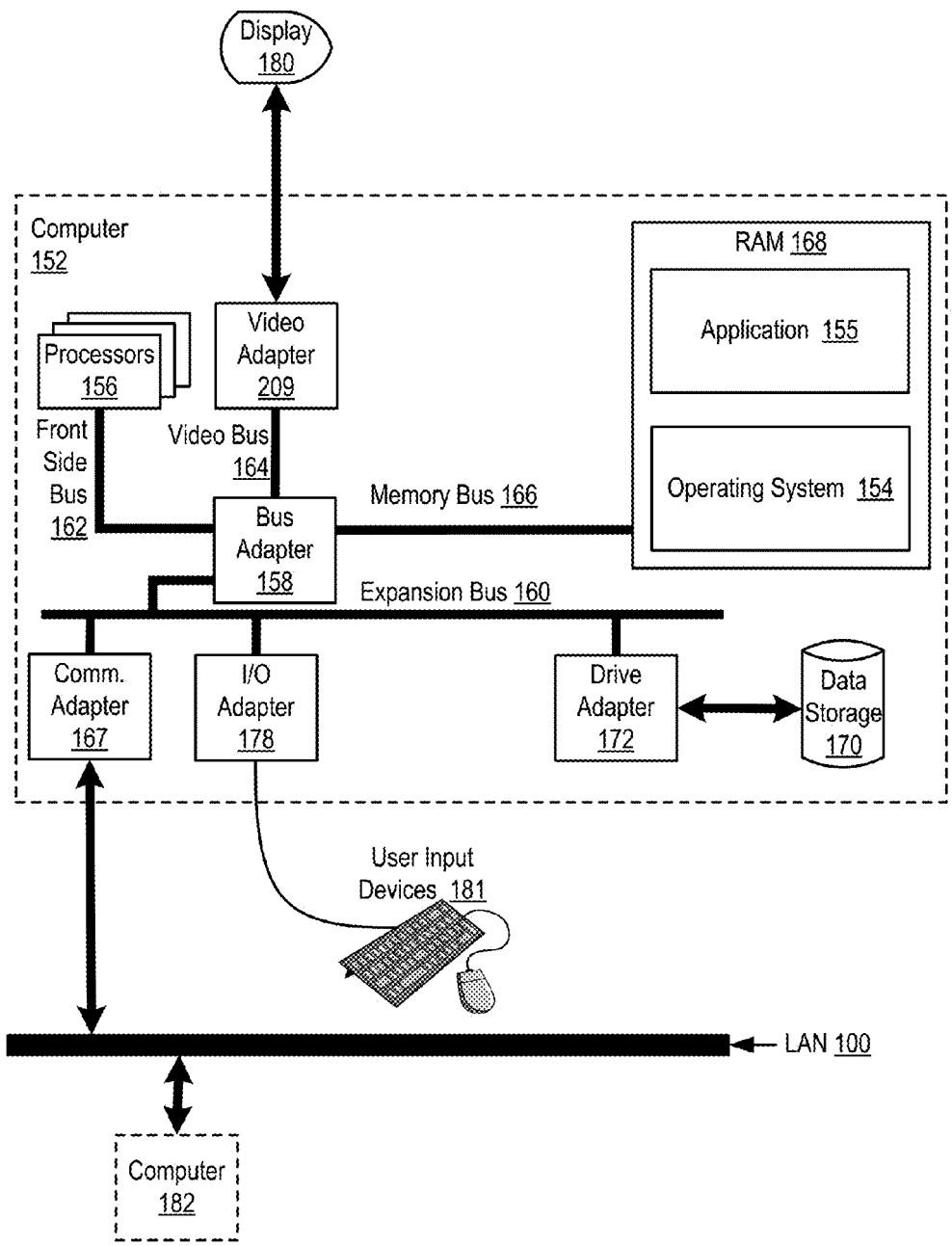
FIG. 1 sets forth a block diagram of automated computing machinery comprising an example computer useful in optimizing computer hardware usage according to embodiments of the present invention.

Example methods, apparatuses, and products for optimizing computer hardware usage in a computing system that includes a plurality of populated CPU sockets in accordance with the present invention are described with reference to the accompanying drawings, beginning with FIG. 1. FIG. 1 sets forth a block diagram of automated computing machinery comprising an example computer (152) useful in optimizing computer hardware usage according to embodiments of the present invention. The computer (152) of FIG. 1 includes at least one computer processor (156) or 'CPU' as well as random access memory (168) ('RAM') which is connected through a high speed memory bus (166) and bus adapter (158) to the processor (156) and to other components of the computer (152). Although not illustrated in FIG. 1, the computer (152) depicted in FIG. 1 can include a plurality of populated CPU sockets. Each CPU socket may be embodied as a mechanical component that provides mechanical and electrical connections between a processor (156) and a printed circuit board (PCB). A CPU socket is 'populated' when a CPU is installed within the CPU socket.

Stored in RAM (168) is an application (155), a module of computer program instructions that, when executed on computer hardware such as the processor (156), causes the computer (152) to perform useful tasks beyond the running of the computer (152) itself. The application (155) may be embodied, for example, as accounting software, enterprise software, graphics software, media players, office suites, and so on.

Also stored in RAM (168) is an operating system (154). Operating systems useful optimizing computer hardware usage according to embodiments of the present invention include UNIX™ Linux™ Microsoft XP™ AIX™ IBM's i5/OS™ and others as will occur to those of skill in the art. The operating system (154) and the application (155) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for optimizing computer hardware usage according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for optimizing computer hardware usage according to embodiments of the present invention include modems for wired dial-up communications, Ethernet (IEEE 802.3) adapters for wired data communications network communications, and 802.11 adapters for wireless data communications network communications.

Figure 2:
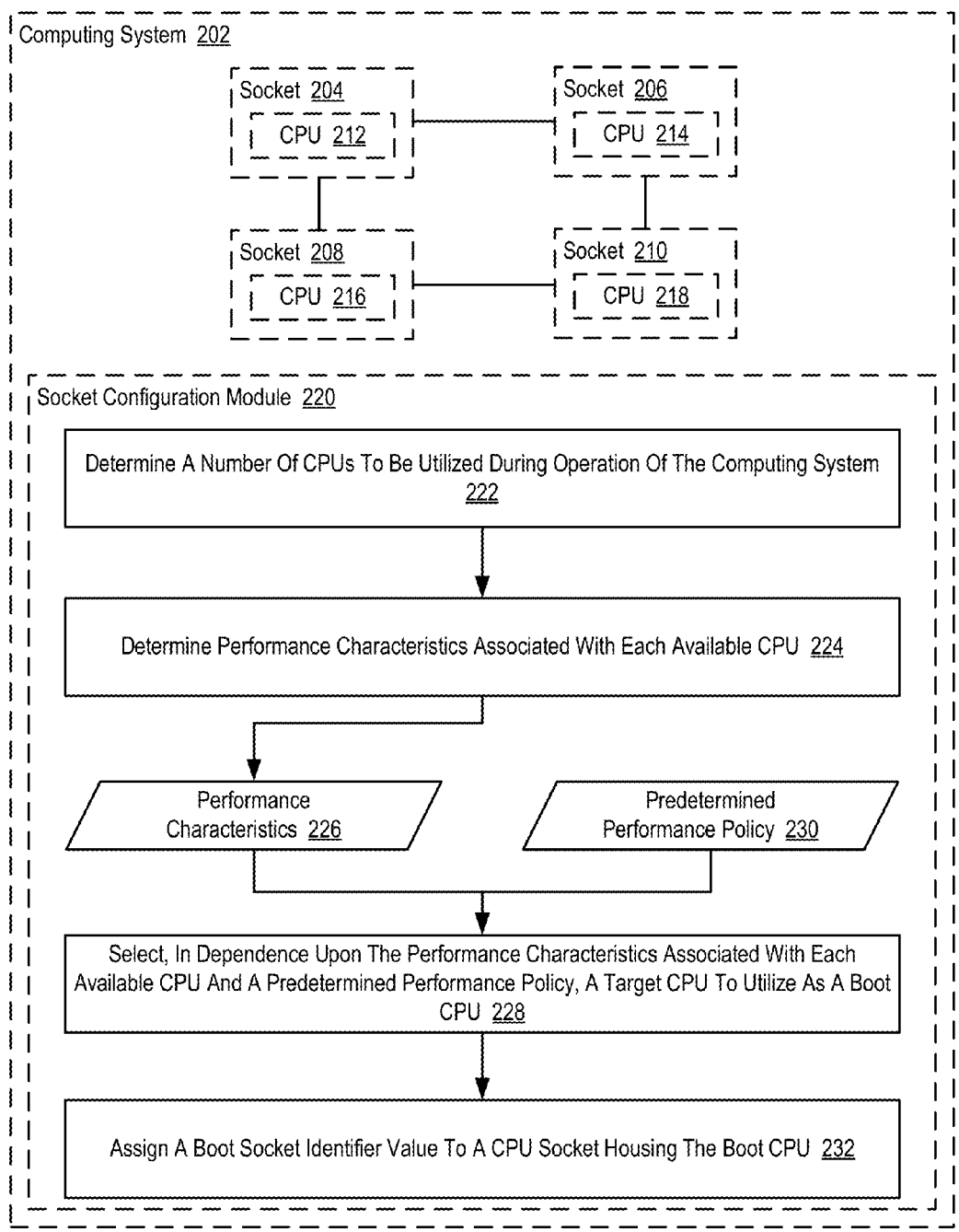
FIG. 2 sets forth a flow chart illustrating an example method for optimizing computer hardware usage in a computing system that includes a plurality of populated CPU sockets according to embodiments of the present invention.

For further explanation, FIG. 2 sets forth a flow chart illustrating an example method for optimizing computer hardware usage in a computing system (202) that includes a plurality of populated CPU sockets (204, 206, 208, 210) according to embodiments of the present invention. The computing system (202) of FIG. 2 may be embodied, for example, as a server, a blade server in a blade center, a desktop computer, and so on. The computing system illustrated in FIG. 2 includes four CPU sockets (204, 206, 208, 210), although in other embodiments the computing system (202) can include any number of two or more CPU sockets. Each CPU socket (204, 206, 208, 210) in FIG. 2 may be embodied as a mechanical component that provides mechanical and electrical connections between a CPU (212, 214, 16, 218) and a PCB. A CPU socket (204, 206, 208, 210) is 'populated' when a CPU (212, 214, 16, 218) is installed within the CPU socket (204, 206, 208, 210).

The example method depicted in FIG. 2 is carried out, at least in part, by a socket configuration module (220). The socket configuration module (220) of FIG. 2 may be embodied, for example, as a module of computer program instructions executing on computer hardware. In some embodiments, the socket configuration module (220) may be embodied as a standalone component such as a field-programmable gate array ('FPGA'), application-specific integrated circuit ('ASIC'), and so on. In alternative embodiments, the socket configuration module (220) may be embodied as computer program instructions that are included in a system management module or other centralized management utility and executed on computer hardware that supports such a system management module or other centralized management utility.

The example method depicted in FIG. 2 includes determining (222), by the socket configuration module (220), a number of CPUs (212, 214, 216, 218) to be utilized during operation of the computing system (202). The computing system (202) of FIG. 2 may be configured, for example, to utilize a number of CPUs (212, 214, 216, 218) that is a power of two during operation of the computing system (202), such that the computing system (202) may operate using one CPU, two CPUs, four CPUs, eight CPUs, and so on. If one CPU (212) illustrated in FIG. 2 fails and becomes inoperable, the computing system (202) of FIG. 2 may therefore be unable to use each of the remaining three CPUs (214, 16, 218) depicted in FIG. 2, as the computing system (202) may not be configured to operate using a three CPU configuration.

Determining (222) the number of CPUs (212, 214, 216, 218) to be utilized during operation of the computing system (202) may be carried out, for example, by the socket configuration module (220) determining how many operational CPUs are installed in the computing system (202). In such an example, the socket configuration module (220) may determine how many operational CPUs are installed in the computing system (202) by initiating a discovery process. After determining how many operational CPUs are installed in the computing system (202), the socket configuration module (220) may subsequently identify the largest number of CPUs that the computing system (202) is configured to utilize that is less than or equal to the number of operational CPUs that are installed in the computing system (202). For example, if the computing system (202) has seven operational CPUs and is configured to operate in a one CPU configuration, a two CPU configuration, a four CPU configuration, and an eight CPU configuration, the socket configuration module (220) may determine (222) that the number of CPUs to be utilized during operation of the computing system (202) should be set to a value of four.

The example method depicted in FIG. 2 also includes determining (224), by the socket configuration module (220), performance characteristics (226) associated with each available CPU (212, 214, 216, 218). The performance characteristics (226) associated with each available CPU (212, 214, 216, 218) may include performance characteristics that describe the operation of each available CPU (212, 214, 216, 218) such as, for example, the frequency at which each available CPU (212, 214, 216, 218) can process instructions and the size of on-chip memory for each available CPU (212, 214, 216, 218). The performance characteristics (226) associated with each available CPU (212, 214, 216, 218) may also include performance characteristics that describe the operation of other computing devices that are attached to each available CPU (212, 214, 216, 218). Such performance characteristics that describe the operation of other computing devices that are attached to each available CPU (212, 214, 216, 218) may include, for example, the size of off-chip memory such as RAM that is coupled to each available CPU (212, 214, 216, 218), the latency of off-chip memory such as RAM that is coupled to each available CPU (212, 214, 216, 218), the type of I/O devices that are coupled to each available CPU (212, 214, 216, 218), the bandwidth of network adapters that are coupled to each available CPU (212, 214, 216, 218), and so on. In the example method depicted in FIG. 2, determining (224) the performance characteristics (226) associated with each available CPU (212, 214, 216, 218) may be carried out, for example, by the socket configuration module (220) requesting vital product data ('VPD') from each available CPU (212, 214, 216, 218), by the socket configuration module (220) receiving serial presence detect ('SPD') information from memory modules coupled to each CPU (212, 214, 216, 218), by the socket configuration module (220) receiving information identifying the type of I/O device coupled to each CPU (212, 214, 216, 218), by the socket configuration module (220) receiving information identifying the type of communications adapter (e.g., Fibre Channel adapter, Ethernet adapter) that is coupled to each CPU (212, 214, 216, 218), and so on.

The example method depicted in FIG. 2 also includes selecting (228), by the socket configuration module (220) in dependence upon the performance characteristics (226) associated with each available CPU (212, 214, 216, 218) and a predetermined performance policy (230), a target CPU to utilize as a boot CPU. In the example method of FIG. 2, when the computing system (202) is initially booted, one CPU will be responsible for executing the system BIOS and other computer program instructions used to boot the computing system (202). The CPU that is responsible for executing the computer program instructions that are used to boot the computing system (202) is referred herein as the boot CPU.

The predetermined performance policy (230) of FIG. 2 represents a specification of performance preferences for the computing system (202), including performance preferences for the computing system (202) during boot-up of the computing system (202). The predetermined performance policy (230) may indicate, for example, that CPUs that are capable of executing the highest number of instructions per unit of time are preferred during boot-up of the computing system (202), that CPUs that are attached to memory modules with the least amount of latency are preferred during boot-up of the computing system (202), that CPUs that are attached to memory modules with the largest storage volume are preferred during boot-up of the computing system (202), and so on. Selecting (228) a target CPU to utilize as the boot CPU may be carried out by comparing the performance characteristics (226) associated with each available CPU (212, 214, 216, 218) to the predetermined performance policy (230) to identify the available CPU (212, 214, 216, 218) with the performance characteristics (226) that best satisfy the predetermined performance policy (230). In such an example, the CPU that best satisfies the predetermined performance policy (230) may be selected (228) as the target CPU to utilize as the boot CPU, such that the computing system (202) is booted using the CPU that provides the best desired performance as specified by the predetermined performance policy (230).

The example method depicted in FIG. 2 also includes assigning (232), by the socket configuration module (220), a boot socket identifier value to a CPU socket housing the boot CPU. The computing system (202) of FIG. 2 may be configured to automatically utilize a CPU housed in a CPU socket identified by a predetermined socket identifier as the boot CPU. For example, the computing system (202) may be configured to automatically utilize a CPU housed in a CPU socket identified by a socket identifier of '0' as the boot CPU, where each CPU socket (204, 206, 208, 210) is associated with a socket identifier value of 0, 1, 2, or 3. In such an example, the socket configuration module (220) may assign (232) a socket identifier value of '0' to the CPU socket that houses the CPU selected (228) to be utilized as the boot CPU.

Figure 3:
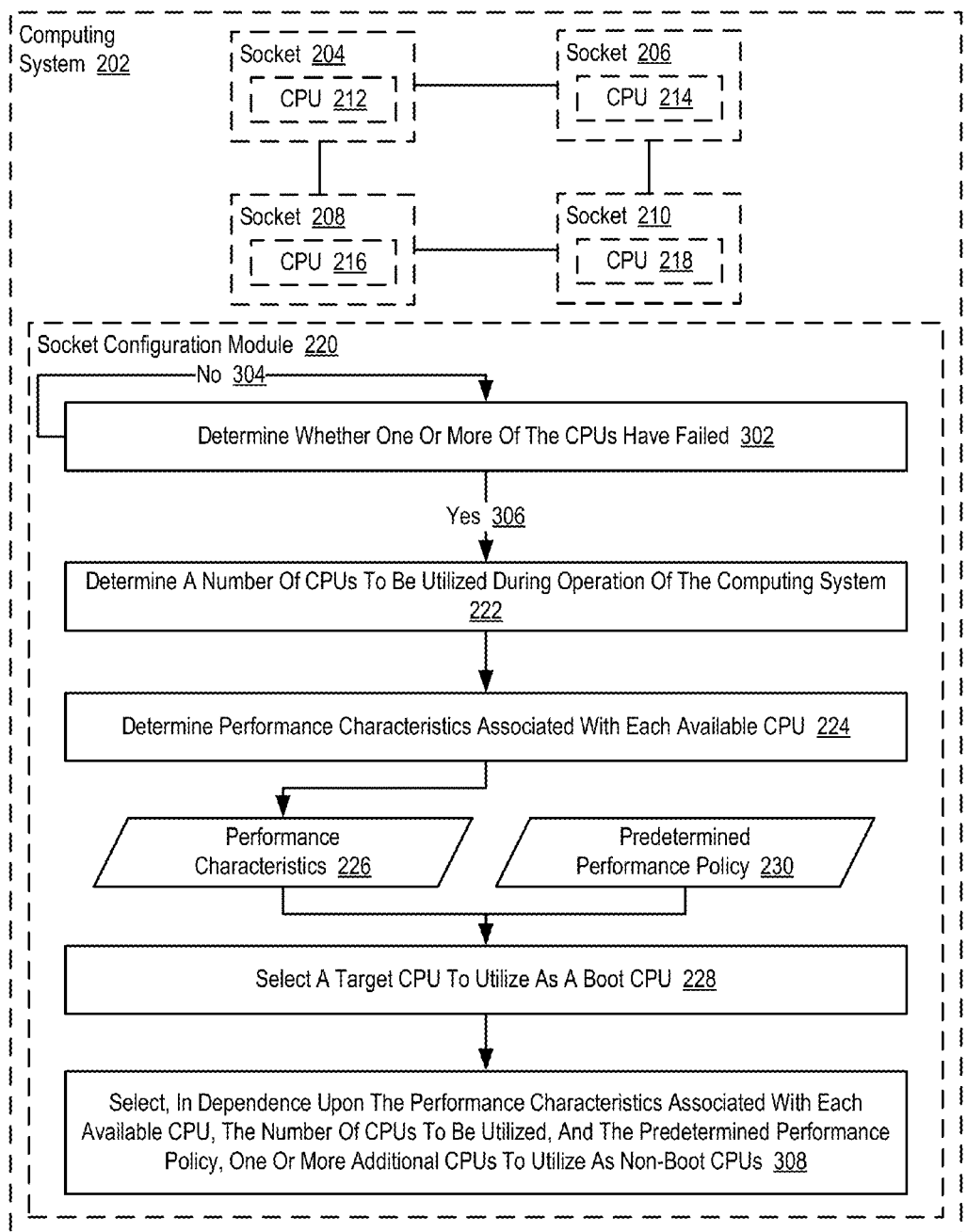
FIG. 3 sets forth a flow chart illustrating an example method for optimizing computer hardware usage in a computing system that includes a plurality of populated CPU sockets according to embodiments of the present invention.

For further explanation, FIG. 3 sets forth a flow chart illustrating an additional example method for optimizing computer hardware usage in a computing system (202) that includes a plurality of populated CPU sockets (204, 206, 208, 210) according to embodiments of the present invention. The example method depicted in FIG. 3 is similar to the example method depicted in FIG. 2, as it also includes determining (222) a number of CPUs (212, 214, 216, 218) to be utilized during operation of the computing system (202), determining (224) performance characteristics (226) associated with each available CPU (212, 214, 216, 218), and selecting (228) a target CPU to utilize as a boot CPU in dependence upon the performance characteristics (226) associated with each available CPU (212, 214, 216, 218) and a predetermined performance policy (230).

The example method depicted in FIG. 3 also includes determining (302), by the socket configuration module (220), whether one or more of the CPUs (212, 214, 216, 218) have failed. Determining (302) whether one or more of the CPUs (212, 214, 216, 218) have failed may be carried out, for example, by the socket configuration module (220) monitoring a communications channel for error messages generated by one or more of the CPUs (212, 214, 216, 218), by the socket configuration module (220) determining that one or more of the CPUs (212, 214, 216, 218) have become unresponsive, and so on.

In the example method depicted in FIG. 3, steps 222, 224, and 228 depicted in FIG. 3 and described above with reference to FIG. 2 are carried out in response to affirmatively (306) determining that one or more of the CPUs (212, 214, 216, 218) have failed. Readers will appreciate that when one or more of the CPUs (212, 214, 216, 218) have failed, the total number of CPUs available for use during operation of the computing system (202) has changed. In view of the fact that only certain CPU configurations (e.g., 1 CPU, 2 CPUs, 4 CPUs, 8 CPUs, and so on) are supported by the computing system (202), the number of CPUs to be utilized during operation of the computing system (202) may need to be reevaluated.

Consider an example in which the computing system (202) is operating in a 4 CPU configuration when a particular CPU (212) fails. In such an example, the computing system (202) may not be able to simply operate using the remaining 3 available CPUs (214, 216, 218). The socket configuration module (220) may therefore be configured, for example, to determine (222) a number of the remaining available CPUs (214, 216, 218) to be utilized during operation of the computing system (202), determine (224) performance characteristics (226) associated with each available CPU (214, 216, 218), and select (228) a target CPU to utilize as a boot CPU in dependence upon the performance characteristics (226) associated with each of the remaining three available CPUs (214, 216, 218) and a predetermined performance policy (230).

The example method depicted in FIG. 3 also includes selecting (308), by the socket configuration module (220) in dependence upon the performance characteristics (226) associated with each available CPU (212, 214, 216, 218), the number of CPUs to be utilized, and the predetermined performance policy (230), one or more additional CPUs to utilize as non-boot CPUs. As described above, the socket configuration module (220) selects (228) a particular target CPU to utilize as the boot CPU. After selecting (228) a particular target CPU to utilize as the boot CPU, the socket configuration module (220) may select (308) one or more additional CPUs to utilize as non-boot CPUs in order to increase system performance by the computing system utilizing the CPUs that best satisfy the predetermined performance policy (230).

Consider an example in which the predetermined performance policy (230) specifies that CPUs capable of processing the most instructions per unit of time are preferred. In such an example, assume that CPU (212) was selected (228) as the boot CPU by virtue of being characterized by a clock rate that is higher than the remaining CPUs (214, 216, 218). After selecting (228) CPU (212) as the boot CPU, the socket configuration module (220) may examine the performance characteristics (226) associated with the remaining CPUs (214, 216, 218) to identify which of the remaining CPUs (214, 216, 218) is characterized by a highest clock rate. The remaining CPU (214, 216, 218) that is characterized by the highest clock rate may subsequently be selected (308) to be utilized as a non-boot CPU. In such an example, this process may be repeated until the socket configuration module (220) has identified a number of CPUs that is equal to the number of CPUs that the socket configuration module (220) previously determined (222) are to be utilized during operation of the computing system (202).

Figure 4:
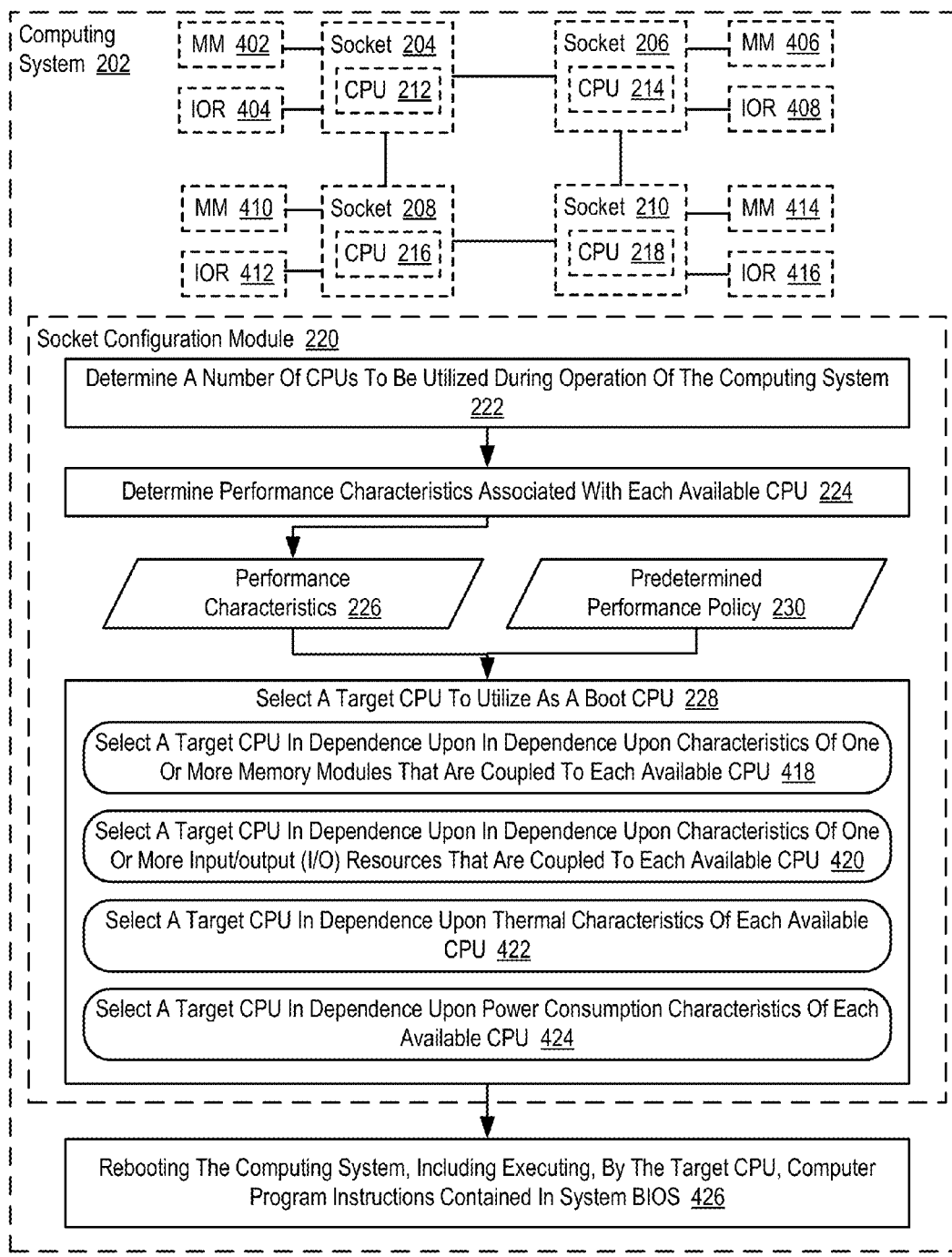
FIG. 4 sets forth a flow chart illustrating an example method for optimizing computer hardware usage in a computing system that includes a plurality of populated CPU sockets according to embodiments of the present invention.

For further explanation, FIG. 4 sets forth a flow chart illustrating an additional example method for optimizing computer hardware usage in a computing system (202) that includes a plurality of populated CPU sockets (204, 206, 208, 210) according to embodiments of the present invention. The example method depicted in FIG. 4 is similar to the example method depicted in FIG. 2, as it also includes determining (222) a number of CPUs (212, 214, 216, 218) to be utilized during operation of the computing system (202), determining (224) performance characteristics (226) associated with each available CPU (212, 214, 216, 218), and selecting (228) a target CPU to utilize as a boot CPU in dependence upon the performance characteristics (226) associated with each available CPU (212, 214, 216, 218) and a predetermined performance policy (230).

In the example method depicted in FIG. 4, selecting (228) a target CPU to utilize as a boot CPU in dependence upon the performance characteristics (226) associated with each available CPU (212, 214, 216, 218) and a predetermined performance policy (230) can include selecting (418) a target CPU in dependence upon characteristics of one or more memory modules (402, 406, 410, 414) that are coupled to each available CPU (212, 214, 216, 218). In the example method depicted in FIG. 4, each CPU (212, 214, 216, 218) may be coupled to one or more memory modules (402, 404, 406, 408) via a memory bus and a memory controller. Each memory module (402, 404, 406, 408) may be embodied, for example, as a dual in-line memory module ('DIMM'), single in-line memory module ('SIMM'), and so on.

In the example method depicted in FIG. 4, the characteristics of one or more memory modules (402, 406, 410, 414) that are coupled to the target CPU describe one or more attributes of the memory modules (402, 406, 410, 414). The characteristics of the one or more memory modules (402, 406, 410, 414) may include, for example, the total amount of memory available in the one or more memory modules (402, 406, 410, 414) that are coupled to the target CPU, the rate at which data can be read from or written to the one or more memory modules (402, 406, 410, 414) that are coupled to the target CPU, and so on. In such a way, a predetermined performance policy (230) that places a premium on fast-access memory may result in a target CPU that is connected to memory modules with a faster access rate being selected (228) as the boot CPU, while a predetermined performance policy (230) that places a premium on higher volumes of available memory may result in a target CPU that is connected to memory modules with a large storage capacity being selected (228) as the boot CPU.

In the example method depicted in FIG. 4, selecting (228) a target CPU to utilize as a boot CPU in dependence upon the performance characteristics (226) associated with each available CPU (212, 214, 216, 218) and a predetermined performance policy (230) can include selecting (420) a target CPU in dependence upon characteristics of one or more input/output (I/O) resources (404, 408, 412, 416) that are coupled to the target CPU. The one or more I/O resources (404, 408, 412, 416) depicted in FIG. 4 may be embodied, for example, as a mezzanine card, as an expansion card, or as another piece of computing equipment that is coupled to a particular CPU via an expansion bus such as a Peripheral Component Interconnect ('PCI') bus, Peripheral Component Interconnect Express ('PCIe') bus, and so on. Such I/O resources (404, 408, 412, 416) can include video cards, sound cards, network cards, modems, or any other computing component useful in delivering output to a user of the computing system (202) and receiving input from a user of the computing system (202).

The characteristics of one or more input/output (I/O) resources (404, 408, 412, 416) that are coupled to the target CPU can include, for example, an identification of the type of the I/O resource (404, 408, 412, 416) that is coupled to a particular CPU, the bandwidth available between the I/O resource (404, 408, 412, 416) and a particular CPU, and even the availability or existence an I/O resource (404, 408, 412, 416) to a particular CPU. Consider an example in which two CPUs (216, 218) are directly connected to a PCIe storage device over a PCIe bus while the remaining CPUs (212, 214) are not directly connected to a PCIe storage device over a PCIe bus. In such an example, when the user would prefer to boot-up the computing system (202) utilizing a CPU with a direct connection to a PCIe storage device, a predetermined performance policy (230) that places a premium on a direct connection to PCIe storage device may result in a target CPU that is directly connected to a PCIe storage device being selected (228) as the boot CPU.

In the example method depicted in FIG. 4, selecting (228) a target CPU to utilize as a boot CPU in dependence upon the performance characteristics (226) associated with each available CPU (212, 214, 216, 218) and a predetermined performance policy (230) can include selecting (422) a target CPU in dependence upon thermal characteristics of each available CPU (212, 214, 216, 218). In the example method depicted in FIG. 4, the thermal characteristics of each available CPU (212, 214, 216, 218) can include information identifying how much heat is generated during the operation of a particular CPU (212, 214, 216, 218). In addition, the thermal characteristics of each available CPU (212, 214, 216, 218) can include information identifying how much heat is introduced into the computing system (202) during the operation of a particular combination of CPUs (212, 214, 216, 218).

Consider an example in which CPU (218) has failed, such that a 2-CPU configuration that does not include CPU (218) will be utilized. In such an example, assume that CPU (212) and CPU (214) are oriented in such a way with respect to a cooling element such as a fan, that the fan does not cause air to flow between CPU (212) and CPU (214), thereby causing heat generated by CPU (212) and CPU (214) to remain in the computing system (202). Further assume that in such an example, however, that CPU (212) and CPU (216) are oriented in such a way with respect to the same fan that the fan does cause air to flow between CPU (212) and CPU (216), thereby causing heat generated by CPU (212) and CPU (216) to be removed from the computing system (202) via a vent or other mechanism. In such an example, the thermal characteristics associated with the combination of CPU (212) and CPU (216) would be preferable to the thermal characteristics of CPU (212) and CPU (214). As such, selecting (422) a target CPU in dependence upon thermal characteristics of each available CPU (212, 214, 216) may cause CPU (216) to be selected as the boot CPU, given that CPU (216) can be combined with other active CPUs (e.g., CPU (212)) in a thermally advantageous manner.

In the example method depicted in FIG. 4, selecting (228) a target CPU to utilize as a boot CPU in dependence upon the performance characteristics (226) associated with each available CPU (212, 214, 216, 218) and a predetermined performance policy (230) can include selecting (424) a target CPU in dependence upon power consumption characteristics of each available CPU (212, 214, 216, 218). In the example method depicted in FIG. 4, each available CPU (212, 214, 216, 218) may consume different amounts of power. As such, selecting (424) a target CPU in dependence upon power consumption characteristics of each available CPU (212, 214, 216, 218) may therefore be carried out by selecting the available CPU (212, 214, 216, 218) that consumes the least amount of power as the boot CPU.

The example method depicted in FIG. 4 also includes rebooting (426) the computing system (202). In the example method depicted in FIG. 4, rebooting (426) the computing system (202) can include executing, by the target CPU, computer program instructions contained in System BIOS. As described above, a target CPU may be selected (228) to be utilized as the boot CPU and a socket identifier for the selected CPU may be assigned (232 in FIG. 2) to the socket that houses the selected CPU. As such, upon rebooting the computer system (202), the target CPU may begin executing computer program instructions contained in System BIOS as part of the boot process.

Readers will appreciate that the methods and systems described above enable optimal computer hardware usage in a computing system that includes a plurality of populated CPU sockets, as those CPUs with more desirable performance characteristics, including more desirable connected computing components, are selected for utilization over those CPUs with less desirable performance characteristics. Consider an example of a four CPU computing system in which CPU3 becomes inoperable.

As such, available configurations may include utilizing a combination of CPU1 and CPU2, a combination of CPU 1 and CPU 4, or a combination of CPU2 and CPU 4 as the available system configurations. In such an example, if the combination of CPU 1 and CPU 4 include the largest variety of network adapters that are coupled to any combination of CPUs, the combination of CPU 1 and CPU 4 may be utilized when the predetermined performance policy places a greater emphasis on diversity of I/O devices. Alternatively, if the combination of CPU 2 and CPU 4 has the largest volume of memory that is coupled to any combination of CPUs, the combination of CPU 2 and CPU 4 may be utilized when the predetermined performance policy places a greater emphasis on storage space. In such a way, any available combination of CPUs may be used as determined by evaluating how well the performance capabilities associated with each CPU and its connected devices satisfy the performance preferences expressed in the predetermined performance policy.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising a computer processor and a computer memory operatively coupled to the computer processor, the computer memory having disposed within it computer program instructions that, when executed by the computer processor, cause the apparatus to carry out the steps of:
   determining, by a socket configuration module, a number of central processing units ("CPUs") of a computing system to be utilized during operation of the computing system;
   determining, by the socket configuration module, performance characteristics associated with computing devices that are off-chip from the number of CPUs and that are coupled to one or more of the number of CPUs; and
   selecting, by the socket configuration module in dependence upon the performance characteristics associated with the computing devices that are off-chip from the number of CPUs and a predetermined performance policy, a target CPU of the number of CPUs to utilize as a boot CPU.

2. The apparatus of claim 1, wherein the computing devices are within the computing system, and wherein the computing devices comprise one or more of off-chip memory, an input/output device, or a network bandwidth adapter.

3. The apparatus of claim 1 further comprising computer program instructions that, when executed by the computer processor, cause the apparatus to carry out the step of selecting, by the socket configuration module in dependence upon the performance characteristics associated with each available CPU, the number of CPUs to be utilized, and the predetermined performance policy, one or more additional CPUs to utilize as non-boot CPUs.

4. The apparatus of claim 1, wherein the number of CPUs is less than all available CPUs of the computer system, and wherein the number of CPUs is determined according to a configuration policy specifying a CPU configuration of a number of CPUs equaling a greatest power of two less than or equal to a number of all available CPUs of the computer system.

5. The apparatus of claim 1 wherein selecting, by the socket configuration module in dependence upon the performance characteristics associated with each available CPU and a predetermined performance policy, a target CPU to utilize as a boot CPU further comprises selecting a target CPU in dependence upon characteristics of one or more memory modules that are coupled to each available CPU.

6. The apparatus of claim 1 wherein selecting, by the socket configuration module in dependence upon the performance characteristics associated with each available CPU and a predetermined performance policy, a target CPU to utilize as a boot CPU further comprises selecting a target CPU in dependence upon characteristics of one or more input/output (I/O) resources that are coupled to each available CPU.

7. The apparatus of claim 1 wherein selecting, by the socket configuration module in dependence upon the performance characteristics associated with each available CPU and a predetermined performance policy, a target CPU to utilize as a boot CPU further comprises selecting a target CPU in dependence upon thermal characteristics of each available CPU.

8. The apparatus of claim 1 wherein selecting, by the socket configuration module in dependence upon the performance characteristics associated with each available CPU and a predetermined performance policy, a target CPU to utilize as a boot CPU further comprises selecting a target CPU in dependence upon power consumption characteristics of each available CPU.

9. The apparatus of claim 1 further comprising computer program instructions that, when executed by the computer processor, cause the apparatus to carry out the step of rebooting the computing system, including executing, by the target CPU, computer program instructions contained in System BIOS.

10. A computer program product that includes a plurality of populated central processing unit ('CPU') sockets, the computer program product disposed upon a non-transitory, computer readable medium, the computer program product comprising computer program instructions that, when executed, cause a computer to carry out the steps of:

determining, by a socket configuration module, a number of central processing units ("CPUs") of a computing system to be utilized during operation of the computing system;

determining, by the socket configuration module, performance characteristics associated with computing devices that are off-chip from the number of CPUs and that are coupled to one or more of the number of CPUs; and selecting, by the socket configuration module in dependence upon the performance characteristics associated with the computing devices that are off-chip from the number of CPUs and a predetermined performance policy, a target CPU of the number of CPUs to utilize as a boot CPU.

11. The computer program product of claim 10 further comprising computer program instructions that, when executed, cause the computer to carry out the step of assigning, by the socket configuration module, a boot socket identifier value to a CPU socket housing the boot CPU.

12. The computer program product of claim 10 further comprising computer program instructions that, when executed, cause the computer to carry out the step of selecting, by the socket configuration module in dependence upon the performance characteristics associated with each available CPU, the number of CPUs to be utilized, and the predetermined performance policy, one or more additional CPUs to utilize as non-boot CPUs.

13. The computer program product of claim 10 further comprising computer program instructions that, when executed, cause the computer to carry out the step of determining, by the socket configuration module, whether one or more of the CPUs have failed.

14. The computer program product of claim 10 wherein selecting, by the socket configuration module in dependence upon the performance characteristics associated with each available CPU and a predetermined performance policy, a target CPU to utilize as a boot CPU further comprises selecting a target CPU in dependence upon characteristics of one or more memory modules that are coupled to each available CPU.

15. The computer program product of claim 10 wherein selecting, by the socket configuration module in dependence upon the performance characteristics associated with each available CPU and a predetermined performance policy, a target CPU to utilize as a boot CPU further comprises selecting a target CPU in dependence upon characteristics of one or more input/output (I/O) resources that are coupled to each available CPU.

16. The computer program product of claim 10 wherein selecting, by the socket configuration module in dependence upon the performance characteristics associated with each available CPU and a predetermined performance policy, a target CPU to utilize as a boot CPU further comprises selecting a target CPU in dependence upon thermal characteristics of each available CPU.

17. The computer program product of claim 10 wherein selecting, by the socket configuration module in dependence upon the performance characteristics associated with each available CPU and a predetermined performance policy, a target CPU to utilize as a boot CPU further comprises selecting a target CPU in dependence upon power consumption characteristics of each available CPU.

18. The computer program product of claim 10 further comprising computer program instructions that, when executed, cause the computer to carry out the step of rebooting the computing system, including executing, by the target CPU, computer program instructions contained in System BIOS.

19. The computer program product of claim 10 wherein the non-transitory, computer readable medium comprises a storage medium.

\* \* \* \* \*